United States Patent
Yae et al.

(10) Patent No.: US 9,451,549 B2
(45) Date of Patent: Sep. 20, 2016

(54) METHOD FOR CONTROLLING A BLUETOOTH CONNECTION

(71) Applicants: Hyundai Motor Company, Seoul (KR); Kia Motors Corporation, Seoul (KR); Hyundai Mobis Co., Ltd., Seoul (KR)

(72) Inventors: Seong Soo Yae, Osan-si (KR); Ji Un Kim, Seoul (KR)

(73) Assignees: HYUNDAI MOTOR COMPANY, Seoul (KR); KIA MOTORS CORPORATION, Seoul (KR); HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 14/507,279

(22) Filed: Oct. 6, 2014

(65) Prior Publication Data

US 2015/0327173 A1    Nov. 12, 2015

(30) Foreign Application Priority Data

May 9, 2014    (KR) ........................ 10-2014-0055642

(51) Int. Cl.
*H04W 52/02*    (2009.01)
*H04L 29/08*    (2006.01)
(Continued)

(52) U.S. Cl.
CPC .......... *H04W 52/0251* (2013.01); *H04L 67/12* (2013.01); *H04W 4/008* (2013.01); *H04W 52/0229* (2013.01); *H04W 76/06* (2013.01);
(Continued)

(58) Field of Classification Search
CPC ........... H04W 52/0229; H04W 76/06; H04W 84/18; H04W 4/008; H04W 52/0225; H04W 52/0251; H04W 52/0261; H04L 67/12
See application file for complete search history.

(56) References Cited

U.S. PATENT DOCUMENTS

| | | |
|---|---|---|
| 2003/0027608 A1 | 2/2003 | Carmeli et al. |
| 2004/0264387 A1 | 12/2004 | Gibeau |
| 2005/0202852 A1 | 9/2005 | Wada |

(Continued)

FOREIGN PATENT DOCUMENTS

| | | |
|---|---|---|
| KR | 10-2007-0098127 A | 10/2007 |
| KR | 10-2008-0013434 A1 | 2/2008 |

(Continued)

OTHER PUBLICATIONS

Non-Final Office Action dated Apr. 6, 2016, issued in U.S. Appl. No. 14/987,431.

*Primary Examiner* — Lewis West
(74) *Attorney, Agent, or Firm* — McDermott Will & Emery LLP

(57) ABSTRACT

A method for controlling a Bluetooth connection includes turning off an ignition of a vehicle. It is determined whether a terminal connected to a Bluetooth system provided in the vehicle exists or not. When it is determined that the connected terminal exists as a result of determining, a disconnection command for the Bluetooth connection is transmitted from the vehicle to the terminal. The Bluetooth system waits for a time predetermined by the Bluetooth system, after transmitting the disconnection command. After waiting for the predetermined time, it is determined whether a disconnection confirmation message responding to the disconnection command is received from the terminal or not. When it is determined that the disconnection message is received as a result of determining whether the disconnection message is received or not, the Bluetooth system is caused to enter into a sleep mode.

3 Claims, 2 Drawing Sheets

(51) Int. Cl.
*H04W 4/00* (2009.01)
*H04W 76/06* (2009.01)
(52) U.S. Cl.
CPC ..... *H04W 52/0225* (2013.01); *H04W 52/0261* (2013.01)

(56) References Cited

U.S. PATENT DOCUMENTS

| | | |
|---|---|---|
| 2006/0079182 A1 | 4/2006 | Matsuda |
| 2007/0120948 A1 | 5/2007 | Fujioka et al. |
| 2007/0281735 A1 | 12/2007 | Suzuki |
| 2008/0039018 A1 | 2/2008 | Kim |
| 2010/0142735 A1 | 6/2010 | Yoon et al. |
| 2010/0248693 A1 | 9/2010 | Suzuki |
| 2011/0177780 A1 | 7/2011 | Sato et al. |
| 2011/0237191 A1 | 9/2011 | Saito et al. |
| 2011/0250843 A1 | 10/2011 | Heo |
| 2011/0306338 A1* | 12/2011 | Ozaki ................ H04W 76/028 455/423 |
| 2012/0244814 A1 | 9/2012 | Okayasu |
| 2013/0029604 A1 | 1/2013 | Saito et al. |
| 2014/0176736 A1 | 6/2014 | Sato |
| 2015/0271858 A1 | 9/2015 | Chu et al. |

FOREIGN PATENT DOCUMENTS

| | | |
|---|---|---|
| KR | 10-2008-0022465 A | 3/2008 |
| KR | 10-0936136 B1 | 1/2010 |
| KR | 10-2011-0114042 A | 10/2011 |
| KR | 10-2012-0017683 A | 2/2012 |
| KR | 10-2013-0019916 A | 2/2013 |
| KR | 10-2013-0021998 A | 3/2013 |
| KR | 10-2013-0052862 A | 5/2013 |
| KR | 10-2014-0052230 A | 5/2014 |

* cited by examiner

METHOD FOR CONTROLLING A BLUETOOTH CONNECTION

CROSS-REFERENCE TO RELATED APPLICATION

This application is based on and claims benefit of priority to Korean Patent Application No. 10-2014-0055642, filed on May 9, 2014 in the Korean Intellectual Property Office, the entire content of which is incorporated herein by reference.

TECHNICAL FIELD

The present inventive concept relates to a method for controlling a Bluetooth connection, and more particularly, a method for controlling a Bluetooth connection by providing a terminal with accurate and stable information for a connection or disconnection with respect to variation in power that occurs in start up of a vehicle.

BACKGROUND

Since a phone call while driving may distract the driver, in order to prevent this, a hands-free phone call has been widely used for enabling the driver to concentrate on driving without the use of hands.

Early hands-free device is wired and mounted on a mobile phone holder, but in recent years, a product, in which Bluetooth technology is applied and thus the phone call is possible even while leaving the mobile phone in a bag or pocket, has gained popularity.

Bluetooth is the technology according to a specification of the IEEE 802.15.1 short-range wireless communication technology, and it allows electronic devices such as a wireless terminal located within about 10 m, for example, a computer, a cell phone, a headset, a PDA, a printer, a mouse, a keyboard and the like to wirelessly communicate with each other in low cost and low power.

General Bluetooth hands-free devices output an audio signal transmitted from a paired mobile phone or MP3 player through a speaker provided in a vehicle, and transmit the user's voice signal inputted through a microphone provided in a vehicle to the mobile phone when a call function of the mobile phone is used.

Conventional Bluetooth specification was defined so that a Bluetooth device connects when a request for the connection is received and disconnects when a request for releasing the connection. On the basis of this specification, most of the Bluetooth connectivity is maintained in the disconnected state when it is disconnected due to an error of one of devices and there is a problem which it is not reconnected. Also, in the process of applying Bluetooth technology to a vehicle, the problem of being disconnected and not being reconnected occurs frequently and this problem causes customer dissatisfaction.

SUMMARY

One object of the present inventive concept is to provide a method for controlling a Bluetooth connection, which supports a stable Bluetooth connection by excluding an iterative Bluetooth connection and disconnection which may affect the stable connection of Bluetooth according to start-up of a vehicle and transmitting accurate information for the disconnection to a terminal when disconnecting the Bluetooth connection.

One aspect of the present inventive concept relates to a method for controlling a Bluetooth connection including turning off an ignition of a vehicle. It is determined whether a terminal connected to a Bluetooth system provided in the vehicle exists or not. When it is determined that the connected terminal exists as a result of determining, a disconnection command for the Bluetooth connection is transmitted from the vehicle to the terminal. The Bluetooth system waits for a time predetermined by the Bluetooth system, after transmitting the disconnection command. After waiting for the predetermined time, it is determined whether a disconnection confirmation message responding to the disconnection command is received from the terminal or not. When it is determined the disconnection message is received as a result of determining whether the disconnection message is received or not, the Bluetooth system is caused to enter into a sleep mode.

The method may further include returning to the transmitting of the disconnection message, when it is determined that the disconnection message is not received as a result of determining whether the disconnection message is received or not.

The predetermined time may be a time to shut down a controller area network (CAN) provided in the vehicle or a time for the Bluetooth system to store information on the Bluetooth connection in a memory.

Another aspect of the present inventive concept encompasses a method for controlling a Bluetooth connection including rebooting a Bluetooth system provided in a vehicle. It is determined whether the reboot is a normal reboot or not. When it is determined that the reboot is a normal reboot as a result of determining the Bluetooth connection is automatically attempted between the Bluetooth system and a terminal. The method includes waiting for a time predetermined by the Bluetooth system, when it is determined that the reboot is not a normal reboot as a result of determining. After the predetermined time is elapsed, the Bluetooth connection is automatically attempted between the Bluetooth system and the terminal.

The predetermined time may be a time to stably complete a disconnection operation of the Bluetooth connection between the Bluetooth system and the terminal.

In rebooting the Bluetooth system, the Bluetooth system may be rebooted when the level of a battery falls due to aging of the battery of the vehicle or a head unit of the vehicle is reset due to an error of the head unit.

The waiting for the predetermined time may include waiting for the predetermined time in a standby mode.

A method for controlling a Bluetooth connection according to the present inventive concept can support a stable Bluetooth connection by excluding an iterative Bluetooth connection and disconnection which may affect the stable connection of Bluetooth according to start-up of a vehicle and transmitting accurate information for the disconnection to a terminal when disconnecting the Bluetooth connection.

BRIEF DESCRIPTION OF THE DRAWINGS

The above and other objects, features and advantages of the present inventive concept will be more apparent from the following detailed description taken in conjunction with the accompanying drawings, in which.

Figure 2:
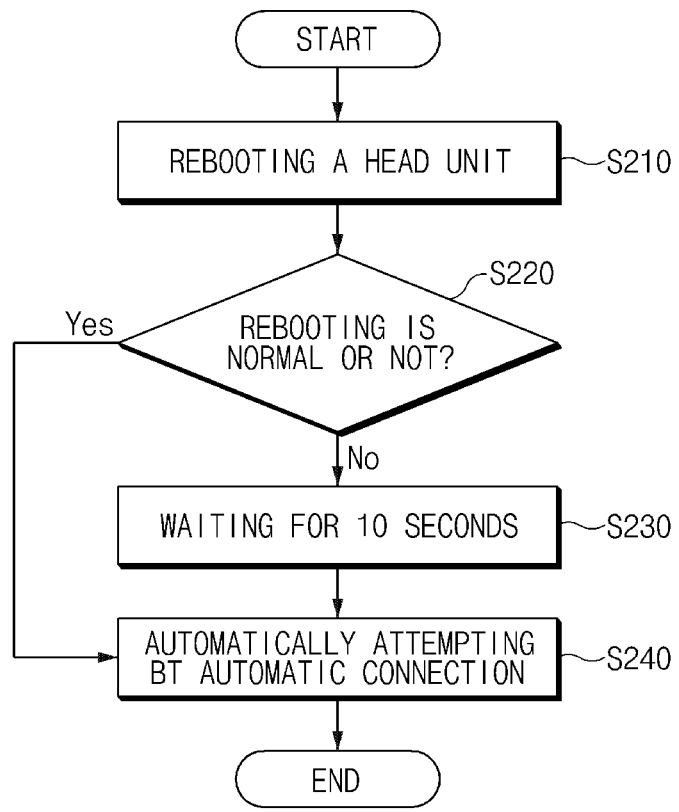

FIG. 2 is a diagram showing a process of starting an automatic connection after waiting for 10 seconds when rebooting a head unit, in a method for controlling a Bluetooth connection according to an embodiment of the present inventive concept.

DETAILED DESCRIPTION

The advantage and features of the present inventive concept and how to achieve it will be explained through embodiments described in detail with the accompanying drawings. However, the inventive concept is not limited to embodiments described herein and may be embodied in other aspects. Only, the described embodiments are provided for explaining to those skilled in the art to which this inventive concept pertains in detail to the extent that it is possible to easily embody the technical spirit of the present inventive concept.

In the drawings, embodiments of the present inventive concept are not limited to the shown specific aspects and are exaggerated in order to clarify. Although specific terms are used herein, it is only used for explaining the present inventive concept, and it is not used for limiting the meaning or the scope of the present inventive concept described in the claims.

The expression "and/or" herein is used as the meaning including at least one of components listed before and after the expression. Also, the expression "connected/coupled" is used as the meaning including being directly connected with another component or indirectly connected through another component. A singular form herein also includes a plural form unless it is specially referred in a phrase. Also, the components, steps, operations and elements referred as "comprise" or "comprising" used herein mean the presence or addition of at least one of other components, steps, operations and elements.

Hereinafter, with reference to the drawings, an embodiment of the present inventive concept will be described in detail.

Wireless communication, especially a Bluetooth connection between a vehicle and a terminal, may be frequently disconnected due to the characteristic of the wireless communication. The operation of the connection and disconnection depending on the user's intention is not a problem, but, regardless of the user's intention, when the Bluetooth connection is disconnected and the control or use of the terminal is limited due to the limitation of wireless communication or communication problems happen between a vehicle and a terminal, it may cause inconvenience of the user of the vehicle, and it may be recognized as a breakdown of the terminal or the communication module of the vehicle and thus, this may cause customer dissatisfaction.

In particular, the specification separately developed or managed for a vehicle may not define or confirm how the operation of the Bluetooth connection and disconnection works. The operation of the Bluetooth connection and disconnection may be designed in relation to the vehicle's power. For this reason, while Bluetooth technology is applied to the vehicle, unlike common electronic devices, since the Bluetooth system for a vehicle uses the power generated depending on the start-up of a vehicle, when the battery power of the vehicle is greatly changed in a moment such as the moment of ACC ON and OFF, the specification for the processing or stabilization method for the Bluetooth connection may not be decided.

The present inventive concept supports a stable Bluetooth connection between a vehicle and a terminal through a series of managing process such as a Bluetooth connection and the management of the connection and the like.

The vehicle may have a head unit including a Bluetooth communication module as a device connecting with a terminal by Bluetooth.

Figure 1:
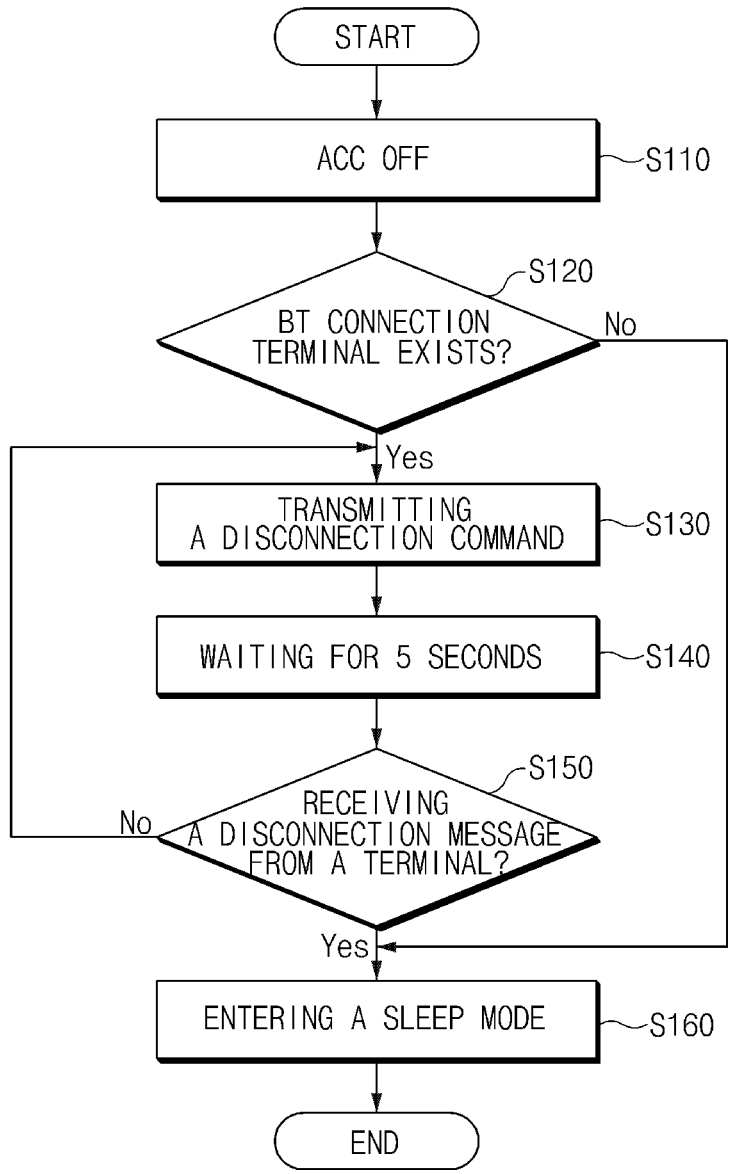
FIG. 1 is a diagram showing a process of transmitting a Bluetooth disconnection command when ACC Off and a head unit is entered into Sleep mode after waiting for 5 seconds, in a method for controlling a Bluetooth connection according to an embodiment of the present inventive concept.

FIG. 1 is a diagram showing a process of transmitting a Bluetooth disconnection command when ACC Off and a head unit is entered into Sleep mode after waiting for 5 seconds, in a method for controlling a Bluetooth connection according to an embodiment of the present inventive concept.

Bluetooth is to connect two different and independent devices. In particular, the performance of the Bluetooth connection of the terminal, which is a target of the connection from the perspective of the vehicle, may not be predicted, for iterative connection and disconnection, it is difficult to predict how much time is needed for iteratively connecting or disconnecting the terminal or whether it can stably handle the request of the iterative connection or disconnection.

In fact, when the head unit having a Bluetooth system for a vehicle is disconnected from power (for example, ACC OFF), because many terminals determine that the Bluetooth is still connected and the link for the corresponding Bluetooth connection is occupied, the occupation of the link may be an obstacle to connect other new device in both the vehicle and the mobile phone.

In such situation, when the user of the vehicle does perform no separate operation, the occupation of the link may be continually maintained during a certain time.

However, in a method for controlling a Bluetooth connection according to an embodiment of the inventive concept, when performing ACC OFF of the vehicle's ignition (S110), it may be determined whether the terminal connected to the Bluetooth system provided in the current vehicle through Bluetooth exists or not (S120).

Then, when it is determined as a result of the determination in step S120 that the terminal connected with the current vehicle through Bluetooth exists, a command relating to the disconnection from the vehicle may be transmitted to the terminal (S130).

Then, the Bluetooth system of the vehicle may wait for a predetermined time, e.g., 5 seconds (S140). Here, the predetermined waiting time may be the time which a controller area network (CAN) provided in the vehicle is shut down depending on ACC OFF operation of the vehicle's user. Also, during the waiting time, the Bluetooth system may store information for the Bluetooth connection determined in step S120. For example, in this case, the Bluetooth system of the vehicle may wait for 5 seconds as a standby mode.

Then, after waiting for the predetermined time in step S140, the Bluetooth system of the vehicle may determine whether the disconnection confirmation message responding to the disconnection command, transmitted from the terminal in step S130, is received or not (S150).

Then, when it is determined as a result of determining whether the disconnection confirmation message is received or not in step S150, that the disconnection confirmation message is received, the Bluetooth system of the vehicle may enter a sleep mode (S160).

In contrast, when it is determined as a result of determining whether the disconnection confirmation message is received or not in step S150, that the disconnection confirmation message is not received, the Bluetooth system of the vehicle may returns to step S130.

Like this, because the Bluetooth connection between the vehicle and the terminal is ended through a normal shutdown process (e.g., disconnection request and response), after that, when connecting the vehicle with the terminal by Bluetooth, the occurrence of the connection failure and the disconnection phenomenon due to the abnormal termination of the previous connection when connecting the vehicle with the terminal by Bluetooth can be minimized.

FIG. 2 is a diagram showing a process of starting an automatic connection after waiting for 10 seconds when rebooting a head unit, in a method for controlling a Bluetooth connection according to an embodiment of the present inventive concept.

When the level of the battery falls due to aging of the battery of the vehicle or the head unit is reset due to an error of the head unit itself, the head unit having the Bluetooth system for a vehicle may be rebooted (S210).

In the existing Bluetooth connection and the management of the vehicle and the terminal, after the head unit is rebooted in this situation, the Bluetooth connection is automatically executed immediately, and as a result, the malfunction of the terminal or the failure of the Bluetooth connection occurs due to duplicate requests of the Bluetooth connection.

However, in a method for controlling a Bluetooth connection according to the present inventive concept, when the Bluetooth system provided in the vehicle is rebooted (S210), it may be determined whether the reboot is normal or not (S220).

When it is determined as a result of determining in step S220 that the reboot of the head unit in step S210 is a normal reboot, the Bluetooth connection between the Bluetooth system of the vehicle and the terminal may be automatically attempted (S240).

However, when it is determined as a result of determining in step S220 that the reboot of the head unit in step S210 is not a normal reboot, the Bluetooth system of the vehicle may wait for a predetermined time (S230). Here, the predetermined time may be the time to stably complete the disconnection operation of the Bluetooth system and the terminal connected before rebooting in step S210, and in this case, for example, the Bluetooth system of the vehicle may wait for 10 seconds in a standby mode.

Then, after the predetermined time in step S230 is elapsed, the Bluetooth connection between the Bluetooth system of the vehicle and the terminal may be automatically attempted (S240).

Like this, when the Bluetooth system is rebooted, the automatic connection of the Bluetooth connection may not be executed immediately. Instead, because the automatic connection is executed after waiting for a predetermined time (for example, 10 seconds), the time for normally operating the head unit of the vehicle can be secured, and the malfunction of the terminal due to the duplicate connection requests related to the Bluetooth connection can be prevented.

After all, a method for controlling a Bluetooth connection according to an embodiment of the inventive concept can exclude an iterative Bluetooth connection and disconnection which may affect the stable Bluetooth connection when performing ACC OFF or ACC ON of the vehicle's ignition, and maintain a stable connection in an upcoming Bluetooth connection of the terminal by transmitting accurate information on the disconnection to a terminal when disconnecting the Bluetooth connection.

In the above description, the present inventive concept has been described through specific examples, but it may be well understood that various modifications can be made without departing from the scope of the present inventive concept. Therefore, the scope of the present inventive concept is not limited to the above described embodiments, and it should be defined by the appended claims and their equivalents. When taking the foregoing description into account, if the modifications and variations of the present inventive concept fall within the following claims and their equivalents, then it is construed that the present inventive concept includes these modifications and variations.

What is claimed is:

1. A method for controlling a Bluetooth connection, comprising steps of:
   determining whether a reboot is a normal reboot or not, when a Bluetooth system provided in a vehicle is rebooted;
   when it is determined that the reboot is a normal reboot as a result of determining, automatically attempting the Bluetooth connection between the Bluetooth system and a terminal;
   when it is determined that the reboot is not a normal reboot as a result of determining, waiting for a time predetermined by the Bluetooth system; and
   after the predetermined time is elapsed, automatically attempting the Bluetooth connection between the Bluetooth system and the terminal,
   wherein the predetermined time is a time to stably complete a disconnection operation of the Bluetooth connection between the Bluetooth system and the terminal.

2. A method for controlling a Bluetooth connection according to claim 1, wherein the step of rebooting the Bluetooth system includes rebooting the Bluetooth system when the level of a battery falls due to aging of the battery of the vehicle or a head unit of the vehicle is reset due to an error of the head unit.

3. A method for controlling a Bluetooth connection according to claim 1, wherein the step of waiting for the predetermined time includes waiting for the predetermined time in a standby mode.

* * * * *